(12) United States Patent
Ludois et al.

(10) Patent No.: US 10,381,871 B2
(45) Date of Patent: Aug. 13, 2019

(54) HIGH POWER TRANSFER THROUGH LOAD-SUPPORTING BEARINGS

(71) Applicant: Wisconsin Alumni Research Foundation, Madison, WI (US)

(72) Inventors: Daniel Colin Ludois, Madison, WI (US); Jiejian Dai, Middleton, WI (US); Skyler Hagen, Markesan, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 146 days.

(21) Appl. No.: 15/637,830

(22) Filed: Jun. 29, 2017

(65) Prior Publication Data
US 2018/0006493 A1    Jan. 4, 2018

Related U.S. Application Data

(60) Provisional application No. 62/356,282, filed on Jun. 29, 2016.

(51) Int. Cl.
*H02J 50/05* (2016.01)
*H02K 7/08* (2006.01)
*F16C 41/00* (2006.01)
*F16C 19/54* (2006.01)

(52) U.S. Cl.
CPC .............. *H02J 50/05* (2016.02); *F16C 19/54* (2013.01); *F16C 41/002* (2013.01); *H02K 7/08* (2013.01); *F16C 2202/32* (2013.01); *F16C 2380/26* (2013.01)

(58) Field of Classification Search
CPC .......... H02J 50/05; H02K 7/08; F16C 41/002; F16C 19/54; F16C 2002/32
USPC ................................................. 307/109, 110
See application file for complete search history.

(56) References Cited

U.S. PATENT DOCUMENTS

2014/0197710 A1    7/2014  Ludois et al.
2016/0329780 A1*  11/2016  Reed .................. H02K 11/0094

* cited by examiner

*Primary Examiner* — John W Poos
(74) *Attorney, Agent, or Firm* — Boyle Fredrickson, S.C.

(57) ABSTRACT

A system for power transfer to a movable platform makes use of a capacitive interface in moving elements of load-supporting bearings for power transfer. Tank circuits associated with each bearing increase power transfer by reducing effective impedance of the small bearing capacitances.

19 Claims, 4 Drawing Sheets

HIGH POWER TRANSFER THROUGH LOAD-SUPPORTING BEARINGS

CROSS-REFERENCE TO RELATED APPLICATIONS

This application claims the benefit of U.S. provisional application 62/356,282 filed Jun. 29, 2016, and hereby incorporated by reference.

STATEMENT REGARDING FEDERALLY SPONSORED RESEARCH OR DEVELOPMENT

This invention was made with government support under DE-EE0006849 awarded by the US Department of Energy. The government has certain rights in the invention.

BACKGROUND OF THE INVENTION

The present invention relates to a method of transferring power to moving electrical loads such as motors or electrical motor components through sliding surfaces of weight-supporting bearings.

The need to transfer electrical power to moving equipment, for example, to an electrical motor that moves with respect to its power source, can occur, for example, in machine tools where the electric motor is mounted on a movable arm or table. A common solution to this problem is the use of flexible cabling communicating between an electric motor and a stationary source of power (for example, a stationary connection to line power). Such cabling can be held, for example, in a flexible cableway to keep it away from engagement with damaging moving surfaces or tangling. Nevertheless, such cable systems can often present an obstruction to the use of the machine and are subject to damage through constant flexure and abrasion.

A similar problem of electrical power transfer can occur in the context of a portion of an electrical motor, for example, a portion that rotates with respect to a stationary power supply. When power must be transferred to a motor rotor, this problem is normally addressed through a system of brushes providing low resistance electrical contact across a sliding surface. Brush systems are highly advanced but are subject to wear and arcing, the latter of which can be a problem in hazardous environments where explosive fumes may accumulate.

U.S. Pat. No. 8,736,137 assigned to the assignee of the present application and hereby incorporated by reference describes a motor (or generator) having air bearings were electrical power is transferred first to the rotor through the air bearings. Such bearings provide an extremely closely fitting shaft and journals having substantial capacitive coupling separated by thin layer of air. High-frequency power is transferred through this capacitive coupling.

Air or other fluid bearings are not practical in a wide variety of bearing applications.

SUMMARY OF THE INVENTION

The present invention provides a method of high power transfer through standard load-supporting bearings. The present inventors have recognized that coatings commonly applied to bearings to decrease wear and arcing across the bearing surfaces provide sufficient insulation and capacitive coupling between the bearing surfaces to permit substantial power transfer at high frequencies now available through solid state power conversion techniques when the small impedances are properly managed with compensating tank circuits. Generally, the high frequencies and tank circuits allow a reduction in the total impedance of the bearing capacitances. This technique permits tens to hundreds of watts of electrical power to be transferred without the drawbacks to flexible cabling and brush systems. The ability to leverage current bearing technology developed for other purposes eliminates the need for specialized or highly sophisticated bearing designs and allows use of the current bearing manufacture and distribution infrastructure.

Specifically, then, in one embodiment, the present invention provides a system for high-power electrical transfer having a first and second bearing each providing a first and second electrically conductive element movable with respect to each other as separated by an electrical insulator, the first and second electrically conductive elements for each of the first and second bearings forming a respective first and second capacitance. First and second tank circuits are associated with the first and second bearings, respectively, and provide electrical elements forming first and second series-resonant circuits with the respective first and second capacitances, the first and second series-resonant circuits having a resonant frequency. A high-frequency power supply having a frequency matching the resonant frequency supplies alternating current along a path from the high-frequency power supply through the first tank circuit and first bearing to load and then, through the second bearing and second tank circuit, to provide a power to the load of at least 10 watts.

It is thus a feature of at least one embodiment of the invention to provide significant power transfer through the intrinsic capacitance of load-supporting bearings eliminating problems of slip rings, brushes, and cabling. By use of the tank circuits and high-frequency power supplies, significant power can be transferred through the impedance of the small capacitances.

The first and second bearings may be slide bearings providing a sliding interface between the electrical insulator and one of the first and second electrically conductive elements or may be roller element bearings providing a point of rolling contact on the electrical insulator.

It is thus a feature of at least one embodiment of the invention to eliminate the effects of variable resistance in the path of current transfer by placing the sliding or rolling contact on the insulator.

The tank circuit may be an inductance in series with a capacitance, the capacitance including a capacitance of the first and second bearings.

It is thus a feature of at least one embodiment of the invention to provide a series-resonant circuit that can serve, in some embodiments, as a current limiter.

The system may further include an automatic tuning circuit adjusting a series-resonance of the tank circuits to match the frequency of the high-frequency power supply with variations in bearing capacitance.

It is thus a feature of at least one embodiment of the invention to maximize power transfer through the small capacitances available in standard bearings through the use of carefully controlled tank circuit parameters.

The first and second bearings may be slide bearings moving along a shaft having a variable thickness insulating coating and wherein the auto tuning circuit provides an output indicating a position of the bearings along the shaft.

It is thus a feature of at least one embodiment of the invention to make use of the auto tuning circuit to provide position information in certain applications.

The first and second rolling element bearings may be ball bearings having spherical rolling elements or roller bearings having cylindrical rolling elements.

It is thus a feature of at least one embodiment of the invention to provide power transfer bearings having relatively little interfacial contact area and substantial separation between the races. The present inventors have determined that even point contact ball bearings can provide sufficient capacitive coupling for this type of transfer.

These particular features and advantages may apply to only some embodiments falling within the claims and thus do not define the scope of the invention.

DETAILED DESCRIPTION OF THE PREFERRED EMBODIMENT

Figure 1:
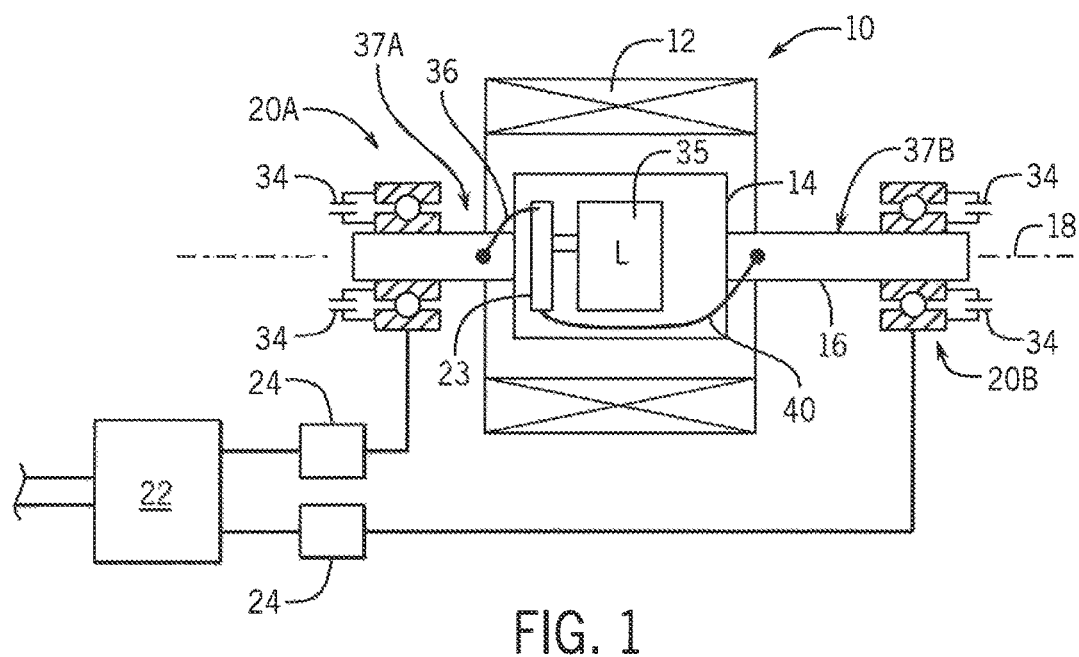
FIG. 1 is a block diagram of a system for high power transfer to a motor rotor using standard roller element bearings providing capacitive coupling driven by a high-frequency power supply and tank circuit.

Referring now to FIG. 1, an electric machine 10 (such as a motor or generator) may include a stator portion 12 and a rotor portion 14, the latter supported on a shaft 16 for rotation about an axis 18 concentrically within the stator portion 12.

The rotor portion 14, for example, may be part of a wound field electric motor or generator having a load 35 in the form of a coil for producing a magnetic field and requiring greater than 10 watts of electrical power and typically greater than 100 watts of electrical power for rated operation. The rotor portion 14 may provide support for rotation and may hold a power reformer circuit 23, for example, providing a rectification or inversion of power received by the rotor portion 14 before an application to the load 35 depending on the demands of the load 35.

Figure 2:
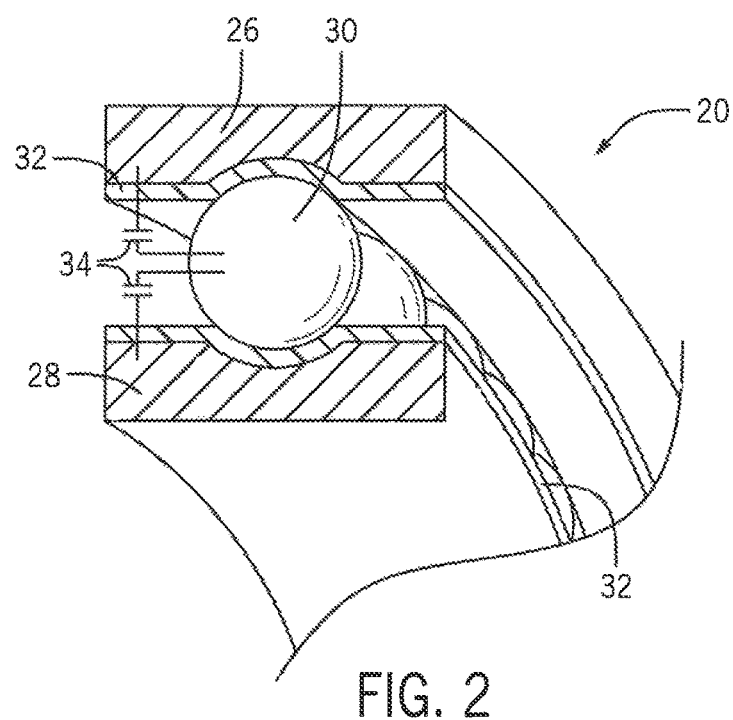
FIG. 2 is a perspective cutaway of a ball bearing showing in partial section an insulating dielectric material applied to one or both bearing races.

The shaft 16 may be supported for rotation at opposite ends by bearings 20a and 20b, for example, off-the-shelf insulating ball or roller bearings. Referring also to FIG. 2, each of the bearings 20 may provide for an annular outer race 26 separated from a concentric annular inner race 28 by multiple roller elements 30, in this example spheres, in rolling contact between the inner race 28 and outer race 26 and distributed around the circumference of the interface between the inner race 28 and outer race 26. The inner race 28, outer race 26, and roller elements 30 will typically be metal such as steel but will be separated at their interengaging surfaces with a protective insulating layer 32 applied to one or both of the opposing surfaces of the inner race 28 and outer race 26.

The insulating layer 32, for example, may be a high-strength oxide ceramic applied by plasma spray to the inner race 28 or outer race 26 typically with a layer thickness of 100 micrometers to greater than 300 micrometers. Such insulation can provide a breakdown voltage of greater than 500 volts and, depending on a layer thickness, can achieve breakdown voltages of greater than 1000-3000 volts with a resistance of greater than one giga-ohm. The proximity of conductors on opposite sides of the insulating layer 32 and the dielectric qualities of the insulating layer 32 may provide a capacitance 34 between the inner race 28 and outer race 26 of 2 to 20 nanofarads and as much as a several picofarads. Generally, the invention contemplates operation with load-supporting bearings having a capacitance of at least 100 picofarads between the inner and outer races or journals that can provide for tens of watts of useful energy transfer. An important application will be bearings that provide 10 nanofarads or more of capacitance which can provide kilowatts of energy transfer. Typically, the invention contemplates that the bearings will provide less than one microfarad of capacitive coupling.

Bearings 20 providing an insulating layer 32 meeting the above criteria can be purchased off-the-shelf where the insulating layer 32 is provided to reduce arcing or pitting of the bearing surfaces caused, for example, by static electricity or fault currents in an electrical motor. Bearings suitable for the present invention are commercially available from Schaeffler Group Industrial of Germany under the FAG tradename in a variety of form factors.

Material such as Teflon or anodized coatings on aluminum surfaces or the like may also be used as the insulating layer 32. Ideally, insulating layer 32 will be thin, have a high dielectric constant, be of high strength and have lubricating properties or be compatible with lubricants.

Electrical power for the rotor portion 14 may be provided by a high-frequency power supply 22 synthesizing power at a frequency of 100 kilohertz or higher and typically at a frequency greater than one megahertz. Such high-frequency power supplies 22 are generally understood in the art and employ low on-resistance solid-state devices to synthesize an AC waveform from rectified DC power using pulse width modulation or a similar technique.

Connections of the terminals of the power supply 22 to annular outer races 26 of the bearings may be via tank circuits 24 providing high Q electrical resonators, for example, in the form of a series-resonant inductive/capacitance circuit and positioned between the power supply 22 and the rotor portion 14. Although the tank circuits 24 are shown separate from the bearings 20, it will be appreciated that part of the tank circuit is the capacitances of those bearings as will be described below. The tank circuits 24 are tuned to a series-resonance at the frequency of the power supply 22 to provide a minimized impedance for power transfer through the circuit and to provide for current limiting as will be discussed below. Two tank circuits 24 are used to accommodate differences in the capacitances 34 associated with the two bearings 20a 20b by providing different tunings. It will be appreciated that at the series-resonance the impedance of the inductance and capacitance cancel each other out providing a minimization of total series impedance increasing the power flow beyond that which could be obtained at the same voltage level through the capacitances 34 alone.

Power then may be transferred from the high-frequency power supply 22, through a first tank circuit 24 and through the capacitance 34 of one bearing 20a, to a first end 37a of the conductive metal shaft 16 which may communicate with one terminal of the power reformer circuit 23 through a conductive interconnect 36. The remaining terminal of the power reformer circuit 23 may connect through a second conductive interconnect 40 to a second end 37b of the shaft 16, this second end 37b otherwise insulated from the first end 37a. Power is then conducted from the second end 37b of the shaft 16 and transferred via capacitance 34 of bearing 20b through a second tank circuit 24 back to the power supply 22. Alternatively, power can be conducted along a conductor attached to or run along the shaft 16 (not shown).

The power reformer circuit 23 may provide rectified DC power to the load 35 and/or may invert the DC power into a lower frequency of one or more phases for powering the load 35 or may provide commutated DC power. An example rectification circuit suitable for use in one embodiment of the power reformer circuit 23 is described in US patent application 2013/0043726 entitled "Wound Field Rotating Machine with Capacitive Power Transfer" assigned to the assignee of the present invention and hereby incorporated by reference.

It will be appreciated that a total series capacitance of 10 nanofarads (for example, through two 20 nanofarads series capacitances 34) can be effectively canceled by a proper selection of a tank circuit 24 providing an offsetting inductive impedance. In this case the power transfer will be limited only by the resistance of the load 35 and the practical need to provide power at the resonant frequency of the inductance and capacitance.

Figure 3:
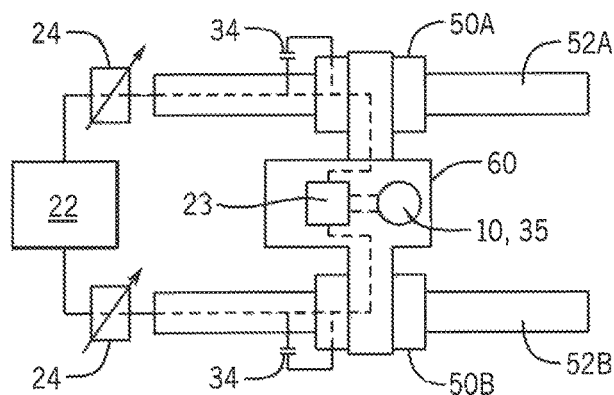
FIG. 3 is a simplified diagram of a machine tool having a moving carriage holding a motor on slide bearings and showing use of the invention in providing high power to the moving motor through the slide bearings.
Figure 4A:
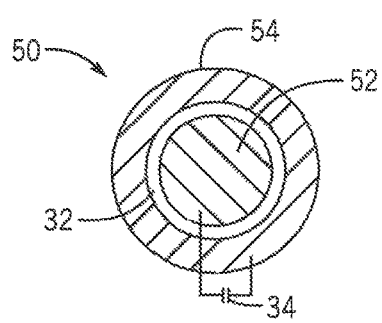
FIGS. 4a and 4b are cross-sectional views of two linear slide bearings, one with recirculating ball bearings showing the insulating material applied between the bearing surfaces.
Figure 4B:
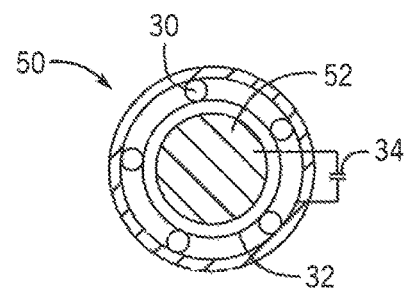

Referring now to FIG. 3, the general principle described above may be extended to sliding bearings 50a and 50b each moving on a separate electrically isolated shaft 52a and 52b. Referring also to FIGS. 4a and 4b, each bearing 50 in this case may be a slide bearing providing, for example, a metal collar 54 having a central bore slidably receiving metal shafts 52 and having an insulating layer 32 applied to one or both of the inner surface of the collar 54 and outer surface of the shaft 52. Again, the insulating layer 32 blocks direct current flow but provides capacitance 34 comparable to that described above. The slide bearings may provide for either linear or rotational motion, for example, when the metal shaft 52 is cylindrical and the collar 54 is a cylindrical collar. In both cases, the metal collar 54 may surround the metal shaft 52 to provide multiple areas of sliding contact (mediated by the insulating layer 32) surrounding the metal shaft 52. Preferably, the insulating layer 32 provides one or both sides of the sliding interface to prevent variations in electrical resistance that might be provided by metal-to-metal contact. This is similarly true with the roller element bearings.

Alternatively, as shown in FIG. 4b, the bearing 50 may provide for recirculating bearing roller elements 30 separating the collar 54 from the shaft 82 by insulating layer 32 applied to one or both of the shaft 52 and inner surface of the collar 54.

The high-frequency power supply 22 may communicate through the tank circuit 24 with one shaft 52a with power passing through a capacitance 34 between components of the bearing 50a to a power reformer circuit 23 on a movable carriage 60 supported on the bearings 50a and 50b. The power reformer circuit 23 may then provide power to an electric machine 10 supported on that carriage 60, for example, the latter driving a cutter on a movable milling machine or the like. The remaining terminal of the power reformer circuit 23 conveys electrical power through the capacitance 34 of the bearing 50b through a second tank circuit 24 to the shaft 52b which may then returned to the power supply 22.

Figure 5:
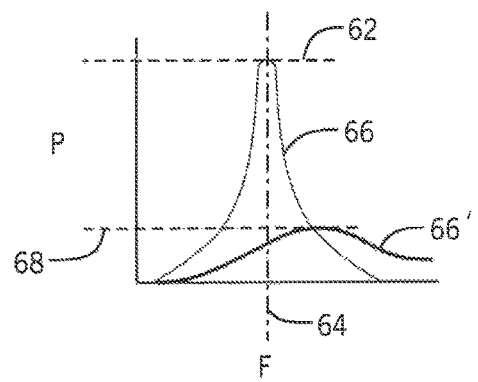
FIG. 5 is a plot of power transfer as a function of frequency through the tank circuit of FIGS. 1 and 3 showing the use of the tank circuit for simple current limiting in the event of insulation failure.

Referring now also to FIG. 5, it will be appreciated that the tank circuit may provide for a maximum power transfer 62 at a frequency 64 tuned to the frequency of the power supply 22. Generally, this power transfer will be a function 66 of frequency according to a quality factor Q of the tank circuit 24, the latter describing the height and sharpness of a resonant peak at the frequency of the power supply 22. Degradation of the insulating layer 32 such as changes the capacitance 34 and/or reduces the resistance of the insulating layer 32 will cause a reduction in the quality factor of the function 66 and/or the shifting of the center frequency of the function 66 (now marked as 66') substantially decreasing the power level 68 transmitted by the tank circuit thus providing inherent current limiting in cases of bearing degradation and or failure. Similar or alternative protection may be provided by current sensing or power sensing in the power supply 22 generally understood in the art.

Figure 6:
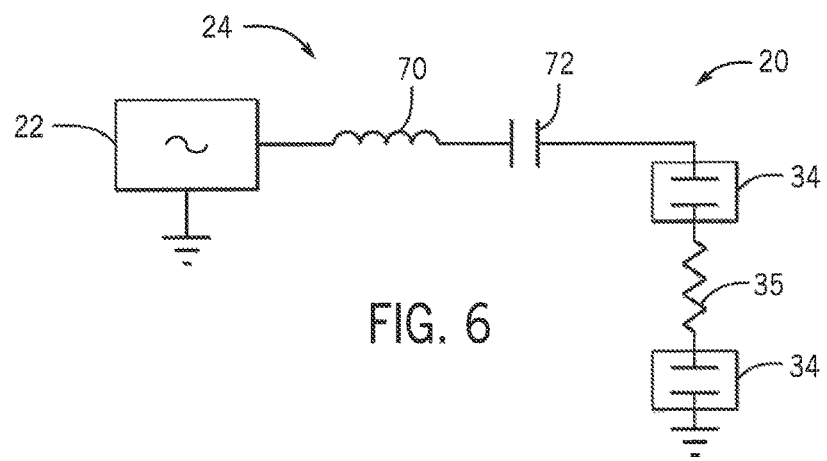
FIG. 6 is a schematic diagram of FIG. 1 showing the inductance and capacitances of the tank circuit of FIGS. 1 and 3.

Referring now to FIG. 6, the tank circuit 24 may include a series-connected inductor 70 and capacitor 72 which are in turn in series with the capacitors 34 of the bearings 20 and the load 35. The value of the inductor 70 and capacitor 72 are selected to provide a series-resonant circuit having a resonant peak substantially equal to a fundamental frequency of the AC power supply 22 as discussed with respect to FIG. 5.

Figure 7:
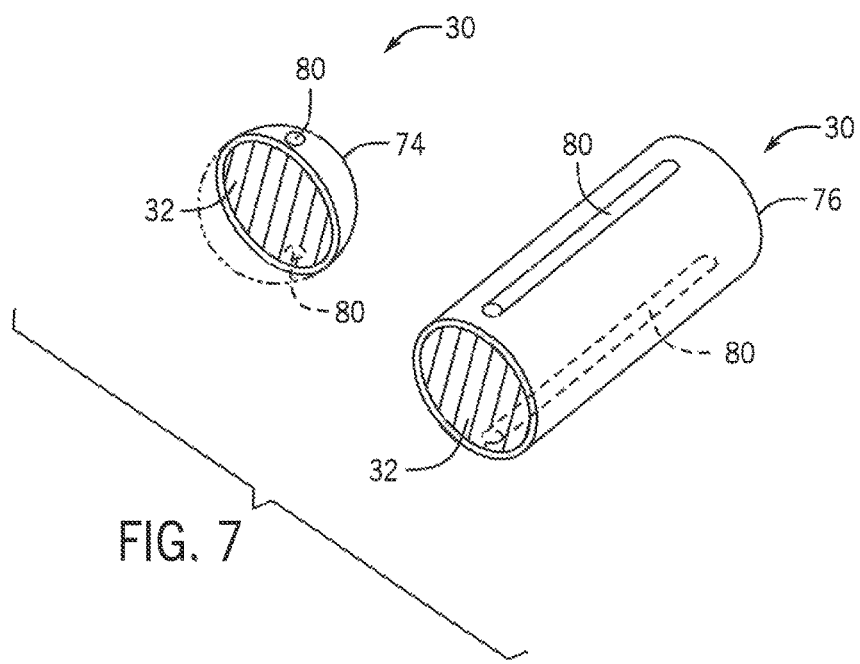
FIG. 7 is a perspective view of a ball and cylinder having an insulating coating that may be used as the roller elements in the bearings of the present invention.

Referring now to FIG. 7, the roller elements 30, as noted above. may be either spheres 74 or cylinders 76, the latter term as used herein also including frustoconical, that is cylinders having nonparallel sides between parallel bases. In some embodiments the outer surface of the roller elements may be coated with a thin insulating material 32, as described above, in lieu of or in addition to placing this material on the races 26 and 28. It will be appreciated that each of these shapes provide relatively small contact areas 80 that represent the closest interface between the effective capacitor plates formed by the bearings 20, with the balls providing a near point of contact 80 at opposite sides of the balls 74 and the rollers 76 providing narrow lines of contact 80. Otherwise, there is substantial separation between conductive surfaces limiting potential capacitance such as might suggest the difficulty in providing capacitive coupling provided by the present invention and yet determined by the present inventors to be surmountable.

Figure 8:
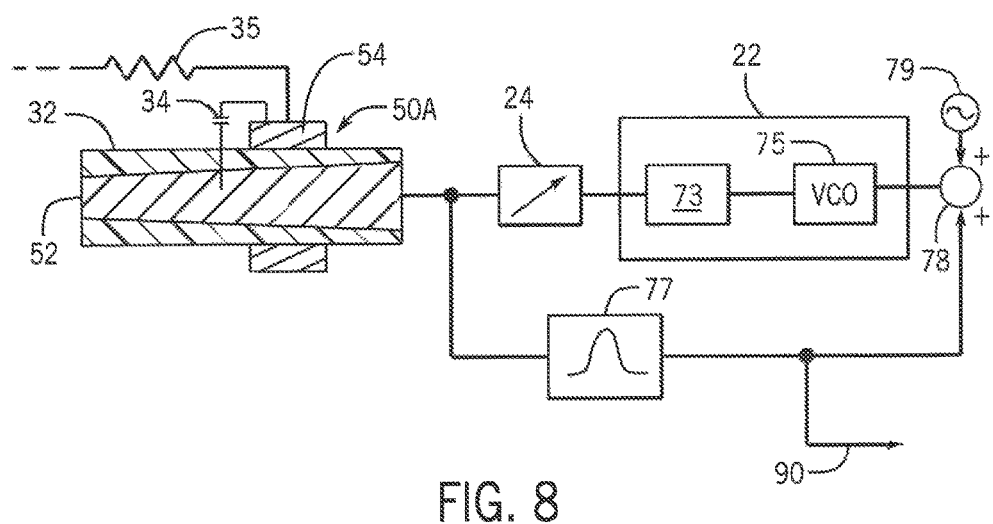
FIG. 8 is a cross-sectional view of one slider bearing of FIG. 3 showing an auto-tuning tank circuit system also providing carriage position signals.

Referring now to FIG. 8, in one embodiment of the system shown in FIG. 3, the shaft 52 may provide for a varying thickness of insulating coating 32, for example, and an anodized layer on an aluminum shaft or ceramic coating on a steel shaft either because of variations in manufacturing processes or intentionally to provide, for example, a linear gradient of thickness of insulating coating 32 as one moves along the shaft 52.

In this case the tank circuit 24 associated with each shaft 52 may be tuned to an average capacitance value and variations in the capacitance 34 may be accommodated by adjusting the frequency of the power supply 22. In this regard, the power supply 22 may include a power stage 73 and a voltage-controlled oscillator 75 providing a sinusoidal signal to be input to the power stage 73 which in turn provides power to the tank circuit 24 connected to the shaft 52.

A small perturbation signal from a signal generator 79 may slightly modulate the voltage-controlled oscillator 75 to determine changes in the capacitor 34 by, for example, detecting phase changes between the current and voltage flowing into the shaft 52 or changes in current magnitude through the use of a phase demodulator 77. The phase demodulator 77 in principle determines whether the resonant peak of the tank circuit 24 in combination with the capacitance 34 has shifted with respect to the frequency of the power supply 22 and makes adjustments using feedback control through an error signal provided to a summing junction 78 receiving the perturbation signal 79 and providing an output to the voltage-controlled oscillator 75. When the thickness of the insulating layer 32 is intentionally varied as a function of length along the shaft 52, the output of the phase demodulator 77 may be used as a position signal 90 to provide an indication of the position of the bearing 50a on the shaft 52, for example, for machine control.

Figure 9:
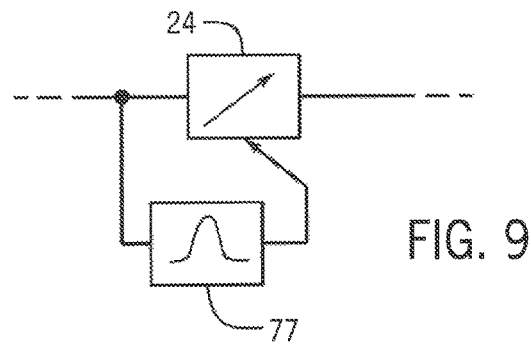
FIG. 9 is a fragmentary view of an alternative form of the auto-tuning tank circuit that changes the tank parameters instead of power supply frequency.

Referring now to FIG. 9, it will be appreciated that the output of the phase demodulator 77 may be alternatively used to change the tuning parameters of the tank circuit 24, instead shifting its resonant peak rather than the frequency of the power supply 22, for example, by changing a variable capacitance or inductance controllable by an electric signal.

These automatic tuning systems described above may be used to effectively automatically tune any of the tank circuits 24 described above.

The present invention can also be employed in the transfer of power from components of electrical generators having wound field elements or generators on a movable platform. In addition, the present invention has application to electrostatic motors, for example, operating in lieu of the capacitive transfer described in US patent application 2013/0106317 entitled: Varying Capacitance Rotating Electrical Machine" (now U.S. Pat. No. 9,184,676) assigned to the assignee of the present invention and hereby incorporated by reference.

While the invention provides for the transfer of large amounts of electrical power suitable for operating electrical motors, it will be appreciated that the same principle of capacitive coupling through load-supporting bearings may be used to transmit lower powered electrical signals, for example, encoding data or the like, through a movable joint. Such data can be transmitted separately, without the transfer of higher levels of power, or through separate electrical paths from the transfer of higher levels of power, or may be transmitted simultaneously through the same path with high-power electrical flow. This latter, simultaneous transmission may, for example, encode the data at a different frequency band than occupied by the high-power signal and may bypass the tank circuit 24 with a narrow pass band filter permitting this separate band to coexist with the power signal. Redundancy and error correcting codes may handle any momentary interruptions in power or electrical interference. Notably the separate frequency band for data may be higher or lower than the megahertz range used by power transmission.

While a significant benefit of the present invention is providing substantial power (in excess of 10 watts) to a motor or component of a motor that moves with respect to the power source, it will be appreciated that this technique can provide electrical power at this level to a variety of different loads including resistive load such as heaters, or complex loads such as electronic circuits.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" can be understood to include one or more controllers or processors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

We claim:

1. A system for high-power electrical transfer comprising:
at least a first and second bearing each providing a first and second electrically conductive element movable with respect to each other as separated by an electrical insulator, the first and second electrically conductive elements for each of the first and second bearings forming a respective first and second capacitance;
a first and second tank circuit associated with the first and second bearing, respectively, the first and second tank circuit providing electrical elements forming first and second series-resonant circuits with the respective first and second capacitances, the first and second series-resonant circuits having a resonant frequency; and
a power supply having a frequency matching the resonant frequency and supplying alternating current along a path from the power supply through the first tank circuit and first bearing to load and then through the second bearing and second tank circuit to provide a power to the load of at least 10 watts.

2. The system of claim 1 wherein the first and second bearings are slide bearings providing a sliding interface between the electrical insulator and one of the first and second electrically conductive elements.

3. The system of claim 2 wherein the first electrically conductive element is a sleeve surrounding the second electrically conductive element to provide a sliding interface over an area surrounding the second electrically conductive element.

4. The system of claim 3 wherein the first and second bearings are selected from the group comprising rotary bearings providing rotation of the first electrically conductive element with respect to the second electrically conductive element and linear bearings providing translation of the first electrically conductive element with respect to the second electrically conductive element and wherein the first and second bearings provide a point of rolling contact on the electrical insulator.

5. The system of claim 1 wherein the first and second bearings are rolling element bearings having rolling elements selected from the group comprising spherical rolling elements and cylindrical rolling elements.

6. The system of claim 1 wherein the electrical insulator is selected from the group consisting of an anodization layer, a ceramic coating, and a Teflon (polytetrafluoroethylene) layer applied to at least one of the first electrically conductive element and the second electrically conductive element.

7. The system of claim 1 wherein the tank circuit is an inductance in series with a capacitance.

8. The system of claim 7 wherein the capacitance includes a capacitance of the first and second bearings.

9. The system of claim 1 further including an automatic tuning circuit adjusting a series-resonance of the tank circuits to match the frequency of the power supply with variations in bearing capacitance.

10. The system of claim 9 wherein the first and second bearings are slide bearings moving along a shaft having a variable-thickness insulating coating and wherein the automatic tuning circuit provides an output indicating a position of the slide bearings along the shaft.

11. The system of claim 1 further including an assembly movable with respect to the power supply as supported on the first and second bearings and wherein the assembly includes a rectifier circuit for rectifying the alternating current for providing power on the assembly.

12. The system of claim 11 wherein at least half the weight of the assembly is supported by the first and second rolling element bearings.

13. The system of claim 1 wherein the power supply has a frequency greater than 100 kilohertz.

14. The system of claim 1 wherein the power supply provides the load with at least 100 Watts of power.

15. The system of claim 1 wherein the first and second bearings each provide capacitance of less than one microfarad.

16. A method of high-power electrical transfer to a moving structure comprising the steps of:
(a) supporting the moving structure on at least a first and second bearing each providing a first electrically conductive element movable with respect to a second electrically conductive element as separated by an electrical insulator to form a first and second capacitance with respect to the first and second bearing;
(b) tuning a first and second tank circuit associated with the first and second bearing respectively to provide first and second series-resonant circuits with respective of the first and second capacitances, the first and second series-resonant circuits having a resonant frequency; and
(c) applying power supply through the first tank circuit, first bearing and load on the moving structure and then through the second bearing and second tank circuit to provide a power to the load of at least 10 watts wherein the power has a frequency matching the resonant frequency.

17. The method of claim 16 wherein the first and second bearings are slide bearings providing a sliding interface between the electrical insulator and one of the first and second electrically conductive elements.

18. The method of claim 16 wherein each tank circuit is an inductance in series with a capacitance including a capacitance of one of the first and second bearings.

19. The method of claim 16 further including automatically adjusting a series resonance of the tank circuits to match the frequency of the power supply with variations in bearing capacitance.

* * * * *